(No Model.)
2 Sheets—Sheet 1.
P. GRAY.
LANTERN FOR BICYCLES.
No. 252,371.  Patented Jan. 17, 1882.
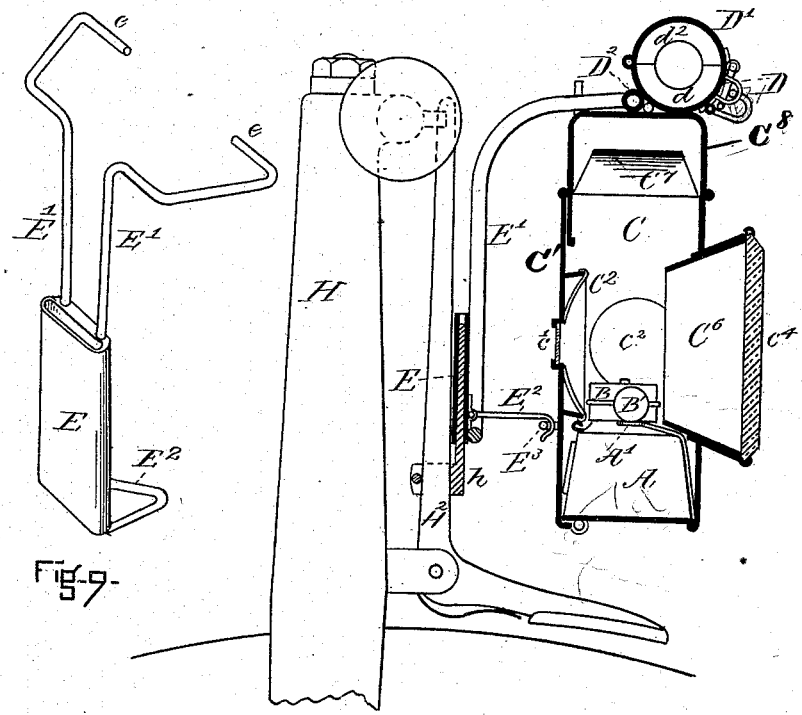
Fig. 9.
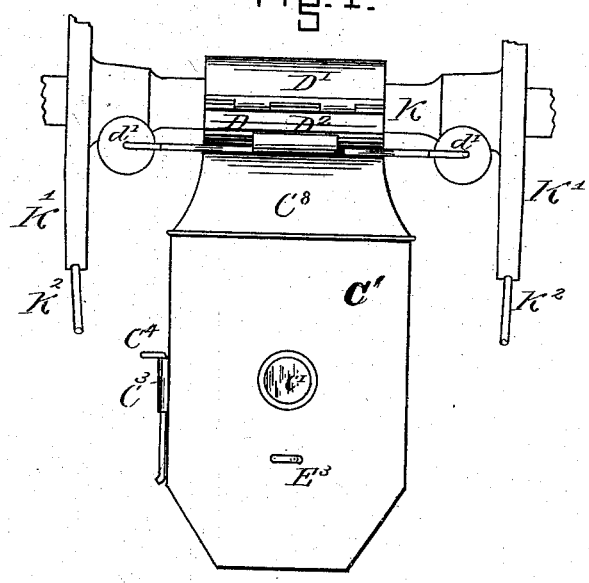
Fig. 1.
Fig. 2.
WITNESSES
H. P. Nash.
A. H. Burbank
INVENTOR
Peter Gray,
By Charles E. Pratt,
Atty.

(No Model.) 2 Sheets—Sheet 2.
P. GRAY.
LANTERN FOR BICYCLES.
No. 252,371. Patented Jan. 17, 1882.
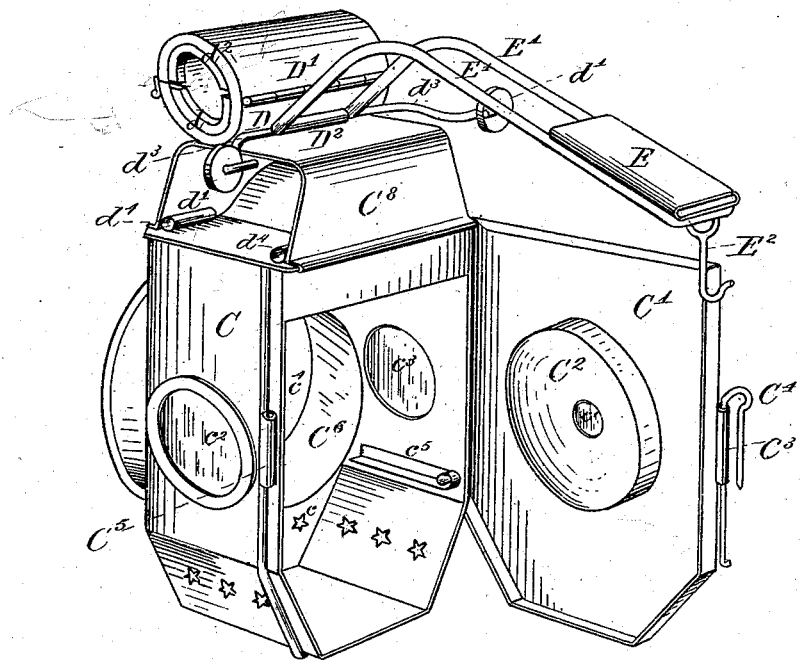
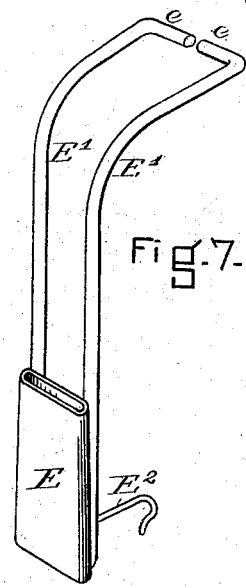
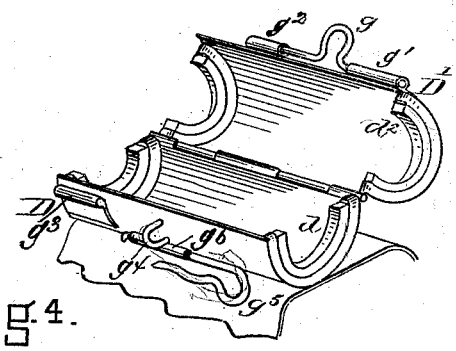
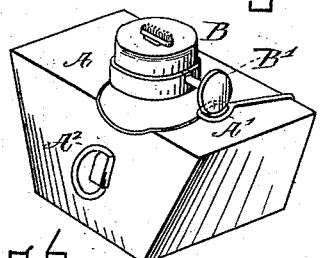
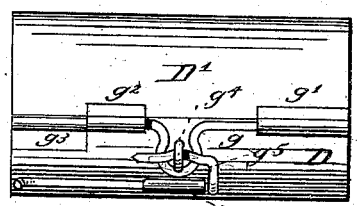
WITNESSES
H. I. Nash.
A. H. Burbank
INVENTOR
Peter Gray,
By Charles E. Pratt,
Atty.
N. PETERS. Photo-Lithographer. Washington, D. C.

UNITED STATES PATENT OFFICE.

PETER GRAY, OF CAMBRIDGE, ASSIGNOR TO THE POPE MANUFACTURING COMPANY, OF BOSTON, MASSACHUSETTS.

LANTERN FOR BICYCLES.

SPECIFICATION forming part of Letters Patent No. 252,371, dated January 17, 1882.

Application filed November 10, 1881. (No model.)

*To all whom it may concern:*

Be it known that I, PETER GRAY, of the city of Cambridge, in the county of Middlesex and Commonwealth of Massachusetts, have invented certain new and useful Improvements in Lanterns for Bicycles and other Velocipedes, of which the following is a specification.

The objects of my invention are to provide a small, light, and convenient lantern for use with bicycles or other velocipedes which shall afford a good light thrown in the proper direction, and which may be secured either to the axle of the wheel or to a clip attached to the head of the bicycle or frame of a tricycle or other velocipede, and also which may combine in its construction mechanism for attachment by which it may be, at the convenience of the user, interchangeably attached either to the frame of the machine or to the axle, inside the wheel; also, to provide safety-fastenings for such a lantern operating so that, while convenient of opening and closing, they shall be impossible of loosening after once being put in place; also, to provide for such a position of the lantern, when suspended from the axle, that it will, under the jar of the wheel as well as the friction of the axle, retain an average vertical position and throw the light well ahead on the path of the machine; also, to provide an effective detainer, by which the wick of the lamp may be prevented from jarring down and causing the light to be extinguished. These objects and the nature of my improvement will appear more fully from the following description and the drawings hereto annexed, in which—

Figure 1 shows in section a lantern embodying my improvements attached by a clip to the brake-bar on the head of a bicycle. Fig. 2 shows the same contrivance, in rear elevation, attached to the axle of the driving-wheel of a bicycle, the contrivance for attaching the lantern to the head or frame of the machine being removed. Fig. 3 shows the same contrivance open, with the lamp removed. Fig. 4 shows in detail the clamp or part by which the lantern is attached to the axle, and Fig. 5 shows the same thing fastened. Fig. 6 shows the lamp removed from the lantern, and Fig. 7 shows the brace or part by which the lantern may be attached to the frame of a velocipede removed from the other parts of the lantern.

A is a lamp. B is a burner containing a wick-tube and wick.

B' is a thumb-wheel on a shaft extending into the burner and having a ratchet-wheel to operate the wick up and down.

A' is a detainer for the thumb-wheel B', and is constructed of spring metal, is attached at one end to the lamp and is free at the other end, and is so adjusted as to press against the periphery of the thumb-wheel B', preferably at two points, as shown in Fig. 6, the operation of this detainer being to allow the thumb-wheel to be turned by applying sufficient force with the thumb and finger, (it being serrated, as usual, on the periphery,) but to press against the periphery with sufficient force to hold it from turning under any jar of the lamp caused by the passing of the wheel over obstructions.

$A^2$ is a hinge for the lamp, by which it may be withdrawn from the handle to allow it to be turned flat against the side of the lamp for compactness.

C is a case or part of the lantern containing the lamp at the bottom, and having air-holes (represented as star-shaped) at c, and having also an opening or openings in the top, and having one side hinged to swing open, as a door to the lantern. As I make it, the back side, or the side opposite to the larger opening and glass front, is the one hinged for the door. This construction is preferable to the usual one of making the front part of the door in that it is light, affords better access, is less likely to sag under weight, gives less danger of breaking the glass front, and has other advantages.

C' is the door or back side of the lantern, just referred to.

$C^2$ is a polished metallic reflector, of concave surfaces, having an opening in the middle.

c' is a small glass in an opening in the door C', which I usually make of red glass.

$c^2$ is a small glass in the left side of the case C, and $c^3$ is a similar small glass in the right side of the case C. I usually make one of these side lights red and the other green, putting the red light to port and the green to starboard.

$c^4$ is a large glass placed in the front part of the case, or in a projection therefrom, of as large diameter as is practicable, and which I usually make of clear plate-glass.

$C^3$ is a fixed loop on the edge of the door $C'$, in which slides the loop and fid $C^4$, the fid end of $C^4$ also sliding in the loop $C^5$ on the edge of the side of the case $C$, opposite the hinge of the door, and by which the door is fastened when closed.

$C^6$ is a reflector, formed of polished metal, on the inside of the projection holding the front glass, $c^4$, and which is on the inside of a conical cylinder, whose smaller diameter is about the same as or a trifle greater than the diameter of the reflector $C^2$.

$C^7$ is a cap over the case $C$, open at its sides; and $C^8$ is a similar cap or top part of the case, also open at its ends, but so arranged with reference to the cap $C^7$ as to break the direction of air-currents, and at the same time allow a draft from the bottom through the top of the lantern.

$c^5$ is a cleat on the inside of the case $C$, which, with another one like it on the opposite side, keeps the lamp from rising up.

$D$ and $D'$ are parts of a cylindrical clamp, having at the ends leather washers $d$ and $d^2$, which take the bearing on the axle $K$ of a bicyle-wheel. These parts $D$ and $D'$ are hinged together on one side, and the part $D$ is attached by means of rivets or other positive fastening to the top part $C^8$ of the lantern. The advantage of fastening with rivets is that no loosening is caused by the heat of the lamp, which is apt to melt solder when used in that position. I attach the part $D$ to or near the forward side of the top $C^8$. Heretofore it has been customary to attach the clamp by which a lantern was held to the axle to the middle of the upper side of this part $C^8$, so that a vertical plane through the middle of the lantern on its longest diameters would cut the middle of the clamp. If the lantern were evenly balanced, this would give to the lantern, when hung upon the axle, a vertical position; but the fact is that the front part is heavier, owing to the projection $C^6$ and the glass front $c^4$ making an inclination of the lantern forward, or, rather, giving a tendency to the bottom to swing back, while the rotation of the axle by friction with the washers $d$ $d^2$ has a tendency to cause the lantern to tip in the same direction, and the result has been heretofore that the light was cast in front, at too short a distance forward of the wheel. In order to correct these tendencies, I have placed the clamp $D$ $D'$ upon the forward part of $C^8$, as described.

$D^2$ is a loop secured to the top $C^8$ by rivets.

$d'$ $d'$ are two leather washers or buffers affixed to the ends of wire arms $d^3$ $d^3$, also affixed to the top part $C^8$. These are for the purpose of preventing the lantern from striking the hubs or spokes of the wheel when suspended inside, where there is a plain axle only, without shoulders or enlargements near the hubs. They are not necessary when these enlargements are present, as shown in Fig. 2.

$E$ is a loop attached to a brace $E'$ $E'$, which is connected with the loop $D^2$.

$E^2$ is a hook hinged or otherwise attached to the bottom end of the brace $E'$, and which, when the lantern is closed, holds the bottom end of the brace securely in position, with reference to the door $C'$, by means of the staple or loop $E^3$.

$g$ is a sliding loop in the fixed loops $g'$ $g^2$ on the front side of the part $D'$.

$g^3$ is a fixed loop on the front side of the part $D$.

$g^4$ is a staple or fixed loop, also in the front side of the part $D$.

$g^5$ is a sliding loop and fid held in a fixed loop, $g^6$, on the lower part of the front side of the part $D$ of the clamp, and which has a curved free end operating as a fid, and by its curvature made to operate as a spring-fid, which it requires considerable force to remove from the fixed loop $g^4$, when once it has been inserted with the loop $g$ between it and the part $D$.

$H$ is the head of a bicycle.

$h$ is a clip having a tongue extending upward, as shown in Fig. 1, and which corresponds in size with the interior of the loop $E$. It is attached at its lower end to the brake-arm $H^2$.

$K$ is the axle of the driving-wheel of a bicycle.

$K'$ $K'$ are the hubs, and $K^3$ $K^2$ are spokes.

Instead of placing the one loop $D^2$ in the position shown in Fig. 3, I sometimes place two similar loops at the junction of the rear side of the top part $C^8$ with the case $C$ just above the top of the door, and make the brace-arms $E'$ $E'$ shorter to correspond. I sometimes also make an opening in the door $C'$ for the loop $C^5$, which latter is placed inward on the case instead of outward, and thus get a double fid on the door $C$; but these modifications are substantially the same in their operation.

Besides the advantages already pointed out, I get by this construction of lantern an interchangeable hub-light and head-light in one lantern, thus meeting a frequent necessity for change of position.

When the lantern is to be used for a hub-light the loop $E$, with its brace and link or hook, may be removed, since the arms $E'$ $E'$ are springs, and the parts $e$ $e$, which fasten in the loop $D^2$ and are kept in place by the spring of the metal, may be drawn apart, so that the brace may be taken off or put in place at the will of the user. When it is desired to open the door $C'$ the hook $E$ is unloosed and the loop $E$ raised in position, as shown in Fig. 3.

The great danger from hub-lamps has arisen from their becoming unfastened and falling between the spokes of the wheel, and thus causing a sudden fall of the rider. By riveting the clamp $D$ $D'$ to the top $C^8$ one source of this danger is overcome, and by the safety-fastening which I have shown the other source is overcome. The operation of this safety-fastening is as follows: The clamp being open, as shown in Fig. 4, the lantern is placed in position on the axle and the part D' brought down to close the cylinder. The slide-loop $g$ is moved along so that the end which slides in the loop $g^2$ is extended into the loop $g^3$. This makes one fastening. The loop $g$ is then bent over upon the fixed loop $g^4$, as I construct it with a little spring. This makes a second fastening. Then the slide-loop $g^5$ is moved along, the fid end being inserted in the loop $g^4$ and pressed along until the bottom of the curve rests between the parts of the loop $g$ and the loop $g^4$, the curvature making it a spring-fid, and this makes the third fastening. The tendency to open being all opposed and reduced to the lowest terms, it is practically impossible for the clamp to become unfastened, and it is also stronger for this treble fastening, so that it is less likely to break or come apart.

$d^4$ $d^4$ are loops in the top of the lantern, (shown in Fig. 3,) and there are two corresponding ones on the opposite side of the lantern. The pair of these loops immediately over the door C' may be used for the shorter brace referred to above and shown in Fig. 9. Fig. 8 shows a removable detent or buffer, $d'$, connected with shorter arms or fingers $d^3$ $d^3$, which latter may be placed in the loops $d^4$ $d^4$, and another one in the same way on the other side, and this form may be used in place of the fixed detents $d'$ $d'$, (shown in Fig. 3,) and may be removed and be placed inside or elsewhere when the lantern is used as a head-light or when the form of hub and axle makes them unnecessary.

Having thus described my improvements and all the parts of the lantern, I claim as new and of my invention—

1. The described bicycle-lantern, consisting of a case, C, with lights $c'$ $c^2$ $c^3$ and opening at the back, reflectors $C^2$ and $C^6$, glass front $c^4$, removable lamp A, open top parts $C^7$ and $C^8$, and a hinged clamp, D D', for suspending the whole upon the axle of a bicycle, said clamp having a safety-fastening, and being connected by rivets to the top $C^8$ at its forward part, all constructed and adapted essentially as set forth.

2. In a bicycle-lantern having a hinged clamp, a fastening device consisting in fixed loops $g'$ $g^2$ $g^3$ $g^4$ $g^6$ and sliding loops $g$ $g^5$, the latter having a curved tongue to form a spring-fid, constructed and adapted to operate substantially as set forth.

3. Combined in a bicycle-lantern having a case, C, and a lamp, A, the open top part $C^8$, a hinged clamp, D D', and a hinged holder having a loop, E, said parts being constructed and adapted to operate substantially as set forth.

4. A velocipede constructed with a case, C, containing a lamp, a door, C', a top, $C^8$, a front glass, $c^4$, and a hinged brace, E' E', bearing a loop, E, and connected with the top and rear of the case, substantially as and for the purposes herein set forth.

5. A removable holder for a velocipede-lantern, consisting in a loop adapted to fit a clip on the frame of the velocipede, a spring-brace, E', for hinged attachment to the case of the lantern, and a catch, $E^2$, for attachment to the rear and lower part of the lantern, when constructed and adapted to operate substantially as herein set forth.

6. The removable detent shown in Fig. 8, constructed with a buffer, $d'$, and short parallel fingers $d^3$ $d^3$ for insertion in loops $d^4$ $d^4$ in the top of the lantern, substantially as and for the purposes set forth.

PETER GRAY.

Witnesses:
C. E. PRATT,
H. I. NASH.